United States Patent [19]
Paplaski

[11] 3,987,686
[45] Oct. 26, 1976

[54] HIGH SPEED REVERSE LOCKOUT CONTROL

[75] Inventor: Joseph Paplaski, Chicago, Ill.

[73] Assignee: International Harvester Company, Chicago, Ill.

[22] Filed: June 23, 1975

[21] Appl. No.: 589,221

[52] U.S. Cl. ............................... 74/476; 74/473 R
[51] Int. Cl.² .......................................... G05G 5/08
[58] Field of Search ................. 74/473 R, 476, 477; 192/.096, .098

[56] References Cited
UNITED STATES PATENTS

| | | |
|---|---|---|
| 3,131,795 | 5/1964 | Shimanckas ..................... 192/.096 |
| 3,242,758 | 3/1966 | Harris et al. ........................ 74/476 |
| 3,274,858 | 9/1966 | Meyer et al. ........................ 74/761 |
| 3,406,588 | 10/1968 | Hobbins ............................. 74/476 |
| 3,418,872 | 12/1968 | Vernati ......................... 192/.098 X |
| 3,456,522 | 7/1969 | Bieber ............................ 74/476 X |
| 3,636,793 | 1/1972 | Bieber ............................ 74/476 X |

*Primary Examiner*—Allan D. Herrmann
*Attorney, Agent, or Firm*—Douglas W. Rudy; Floyd B. Harman

[57] ABSTRACT

A lockout device preventing high vehicle speed when the transmission of the vehicle is in reverse and also preventing the engagement of the high speed range when the transmission is in reverse. A lockout plate prohibits movement of a control valve spool into reverse when the lockout plate is biased into interference by the speed range lever.

4 Claims, 3 Drawing Figures

HIGH SPEED REVERSE LOCKOUT CONTROL

BACKGROUND OF THE INVENTION

1. Field of the Invention

This invention relates to devices that are designed to prevent the accidental engagement of reverse gear. Specifically this invention is a device that prevents the engagement of reverse gear when a tractor vehicle is in a high speed range and also prevents the engagement of a high speed range when the vehicle is in reverse gear.

2. Description of the Prior Art

It is well known in the prior art to provide many different types of reverse gear lockout devices. In general these devices required cognizant action on the part of the vehicle operator in order to override the reverse lockout provision. This was done for safety reasons. It is undesirable for an operator to inadvertently engage reverse gear at certain times. For instance, when a vehicle is travelling in a forward direction at a significant velocity the engagement of reverse gear may contribute to high wear or fatigue of the transmission and drive line components. Also it is felt that it may be more difficult to control a vehicle which is travelling at high speed in reverse gear than it would be to control a vehicle travelling at low speed in reverse gear.

The usual type of reverse gear lockout depended on the placement of a cog, pin or plate, occasionally spring loaded, to prevent the movement of a shift lever into the reverse position.

Other types of systems to prevent the inadvertent engagement of reverse gear include the shift gate and the spring detent. The shift gate is a simple open grid that allows movement of a shift lever in only structured paths. The reverse position could only be reached after a shift lever was moved through a path by the vehicle operator. The spring detent reverse lockout device is equipped with a spring which will normally bias the shaft to the forward gear position only. There are numerous schemes for preventing the inadvertent engagement of reverse gear in a vehicle. The several contributions discussed above are only a few. However, the invention disclosed herein presents a new apparatus for preventing the engagement of reverse gear when a vehicle is in a high speed range and also for preventing the engagement of the high speed range when the vehicle is in reverse gear. The instant invention performs its function through an ingenious arrangement of components that makes the intended function extremely reliable.

SUMMARY OF THE INVENTION

This invention is concerned with a lockout device to prevent the rearward movement of a vehicle in a high speed range and also to prevent the engagement of reverse gear when the vehicle is in a high speed range. The vehicle considered in this invention is driven by an engine operating through a hydrostatic transmission. The vehicle speed is controlled by a speed range lever which provides either a high or low speed range. The vehicle has a forward-neutral-reverse control valve. When the speed range lever is in the low speed range either the forward, neutral or reverse direction can be selected from the forward-neutral-reverse control valve. When the speed range lever is in the high speed range only forward or neutral can be selected on the control valve. Also when the vehicle is travelling forward in the high speed range reverse cannot be engaged.

The high speed reverse lockout control is used with a hydrostatic transmission having a forward and reverse control valve including a control valve spool. A linkage leads from the forward-neutral-reverse control valve to the dashboard of the vehicle. The linkage has one control link which operates the control valve. A second linkage connects the speed range lever to a lockout plate. When the speed range lever is positioned into the high position the lockout plate is caused to swing into interference with the control link. This interference between the lockout plate and the control link prevents simultaneous positioning of the speed range lever in high position when the positioning of the forward-neutral-reverse control valve is in the reverse position.

One feature of this invention is that the vehicle equipped with the invention cannot be driven in a high speed range while in reverse gear. Also the vehicle cannot be shifted from forward to reverse while in the high speed range.

Another feature of the invention is that this control does not depend on the voluntary action of the part of operator. The lockout provisions are dependent solely on the speed control lever position and the vehicle direction control handle.

Further features and advantages will be specifically pointed out and applied in the following description.

DESCRIPTION OF THE PREFERRED EMBODIMENT

Figures 1, 2, 3:
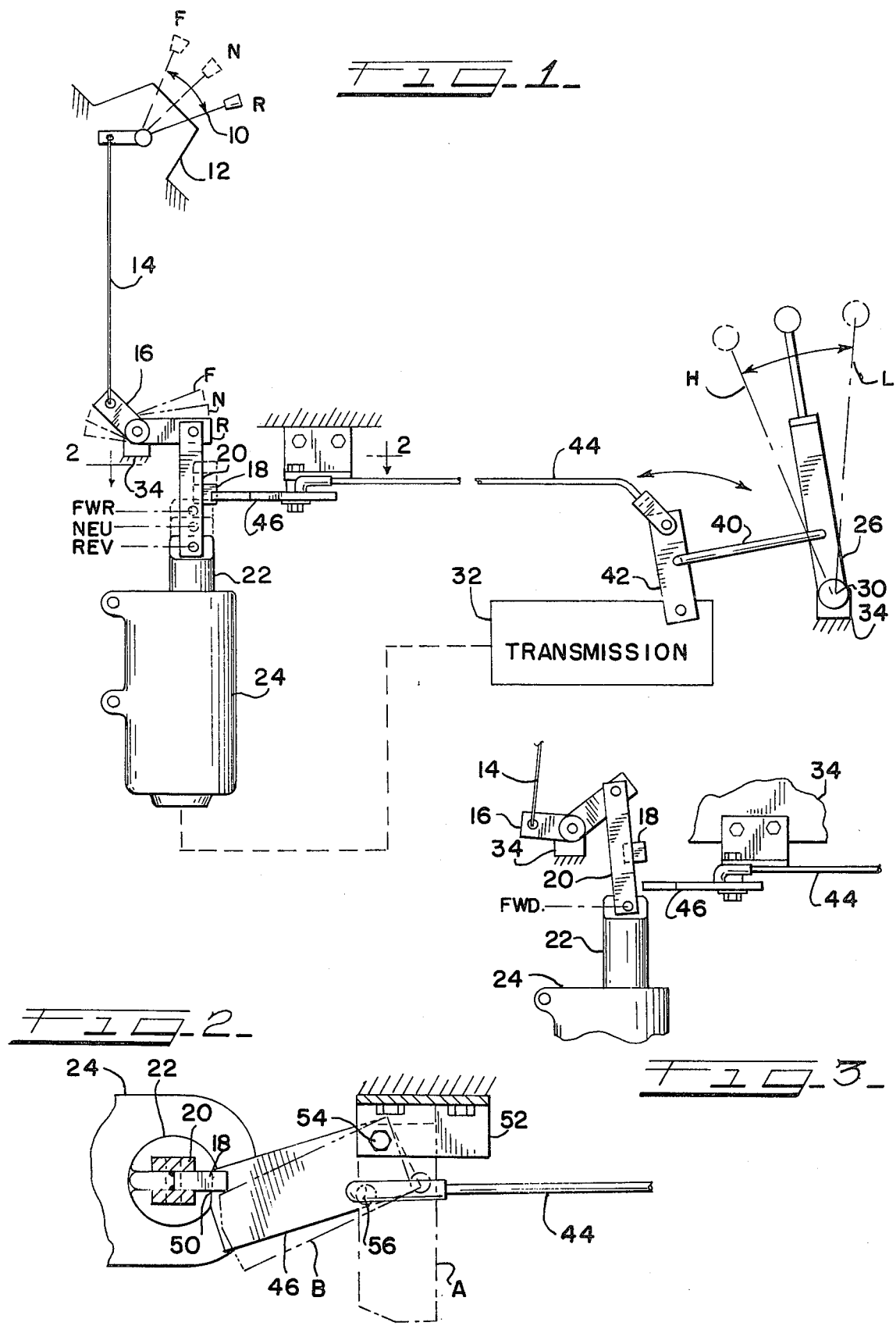
FIG. 1 shows the relationship between linkages of the invention.
FIG. 2 is a top view of a portion of the linkages as seen through plane 2—2 of FIG. 1.
FIG. 3 is an elevation view of a portion of the linkages.

The invention disclosed herein is generally for use on tractor vehicles either industrial or agricultural, equipped with hydrostatic transmissions. The invention is highly adaptable to other related equipment such as loaders, scrapers, earth-movers, etc. As the type of vehicle that would utilize this control is well known in the art it is felt that a specific drawing figure is not necessary for complete understanding of the actual mechanisms. The invention taught by this disclosure should be assumed to reside in a vehicle having at least a frame and a hydrostatic transmission.

Looking at the three figures, and paying particular attention to FIG. 1, a control handle 10 for controlling the operating mode of a transmission, specifically forward-neutral-reverse functions, is carried in and pivotally mounted to an instrument panel 12. Linkage comprised of a rod 14, a bellcrank 16, which is pivotally mounted to the vehicle frame represented at 34, and a control link 20 provides communication of control handle placement with the placement of a control valve spool 22 of a forward-neutral-reverse control valve 24 which is mounted either to the vehicle frame or the hydrostatic transmission such that it controls the output of said transmission. The control link 20 carries an appendage 18 strategically placed thereon.

A speed range lever 26 is pivotally mounted to the vehicle, represented as 34, and can be selectively positioned in either a high range (dotted line position H) or a low range (dotted line position L). This range lever further communicates with the hydrostatic transmission represented by 32 through the means provided by rod 40 and actuated by the speed range lever 26. The speed range lever is positioned by the operator to allow the vehicle to operate in either a low speed range equivalent to ground speeds of between zero and approximately 10 miles per hour (16.09 kilometers per hour) or a high speed range equivalent to ground speeds of between 10 miles per hour (16.09 kilometers per hour) and 25 miles per hour (40.23 kilometers hour) for instance. Range control arm 42 communicates the position of the speed range lever 26 to the transmission 32 and also provides a rod carrying pivot point which provides a pivotal mounting point for control rod 44.

The other end of control rod 44 is pivotally mounted to a lockout plate 46. The lockout plate 46 is a rectangular plate having one corner in the area of numeral 50 machined to allow accommodation of the control valve spool 22. The lockout plate 46 is pivotally mounted to a bracket 52 which is attached to the vehicle frame. The mounting pivot point 54 and the mounting pivot point 56 for the control rod 44 are offset geometrically such that motion of the control rod 44 will produce motion of the lockout plate 46.

Typically, the operation of the high reverse lockout control will be as follows:

In a first case where the operator tries to engage high range when travelling in reverse he is prevented from doing so by the lockout device. With the control handle 10 in the reverse position as shown, the tractor vehicle will be travelling in reverse. Control link 20, having appendage 18 positioned on it, communicates the position of a control valve spool 22 and prevents the movement of the range control arm 42 into high speed range as shown by dotted line view H of FIG. 1 when the control handle is in reverse. The control rod 44 pivoted the lockout plate 46 until it struck the appendage 18 (as shown by dotted line presentation B of FIG. 2) which prevented the movement of the range control arm 42 into the high speed range.

In a second case where the vehicle operator tries to engage reverse while he has the speed range lever in high he will also be prevented from this action by the lockout device.

Assume the control handle 10 in the forward position, as shown by dotted line position F, and the speed range lever 26 in the high speed position as shown by dotted line position H. As the control handle 10 is moved to the reverse position appendage 18 contacts the top surface of the lockout plate 46, which has been rotated into a position between the appendage 18 and the control valve spool 22 as shown in FIG. 2, thus preventing the desired movement. The speed range lever 26 must be moved out of the high range, causing the consequent pivoting of the lockout plate 46 to a position such as those shown by dotted line views A or B of FIG. 2. Once the lockout plate has been pivoted in this manner, the control handle 10 can be moved from the forward position.

Thus, while the invention has been described and shown with particular reference to the disclosed embodiments, there will be apparent that other variations might be possible that would fall within the scope of the present invention, which is not intended to be limited except as defined in the following claims.

What is claimed is:

1. In a hydrostatic transmission having a control valve including a control valve capable of controlling the direction of hydrostatic transmission output, which may be one of forward, neutral or reverse; and a speed range control arm integral with the hydrostatic transmission for controlling the output speed of the hydrostatic transmission to one of high speed or low speed; a means for preventing simultaneous engagement of the high speed range and the reverse direction of hydrostatic transmission output comprising:

control valve operating means including a control handle, a rod connected at one end to the control handle, a bellcrank connected to the second end of the rod and a control link having an appendage connected to the bellcrank at a first end and to the control valve spool at a second end whereby displacement of the control handle results in longitudinal displacement of the control link and subsequent adjustment of the control valve spool in the control valve;

a speed range lever pivotally mounted to move between a high speed range position and a low speed range position;

a rod connected at a first end to the speed range lever and at a second end to the range control arm whereby movement of the speed range lever results in equivalent movement of the range control arm into one of either the high or low speed range positions;

a control rod having a first end pivotally mounted to the range control arm and a second end;

a lockout plate, having a plurality of apertures, pivotally mounted to a first pivot point in proximity to the control link of the control valve operating means and having the second end of the control rod pivotally mounted through one aperture in the lockout plate allowing the lockout plate to be pivoted into interference proximity with the control link when the speed range lever is moved from the low speed position to the high speed position and the control handle for the control valve is in a forward or neutral position and restricting pivotal movement of the lockout plate into position corresponding to the high speed position of the speed range lever through interference between the lockout plate and the appendage on the control link when the control link and the associated control valve spool is positioned to the reverse position by the control valve operating means.

2. The invention in accordance with claim 1 wherein the lockout plate, having a plurality of apertures, is a rectangular plate having one corner cut off to form a polygon.

3. The invention in accordance with claim 1 wherein the lockout plate is equipped with a pair of apertures; the first aperture being used to mount the lockout plate in a pivotal manner and the second aperture accommodating the control rod and the position of the second aperture in relation to the first aperture is offset therefrom to allow the control rod, when moved laterally, to pivot the lockout plate around the pivot point provided by the first aperture.

4. In a hydrostatic transmission having a high speed range and a low speed range and forward and reverse directions of drive, an apparatus for use in preventing the shifting of the hydrostatic transmission into the high speed range when the direction of drive is through the reverse gears and further the apparatus preventing the shifting of hydrostatic transmission into reverse direction of drive when in the high speed range comprising:
- a control valve including a control valve spool, the control valve capable of controlling the direction of the output of the hydrostatic transmission;
- control valve operating means including a control handle, a rod having two ends connected at one end to the control handle, a bellcrank connected to a second end of the rod and a control link having an appendage connected to the bellcrank at a first end into the control valve spool at a second end whereby displacement of the control handle results in longitudinal displacement of the control link and subsequent adjustment of the control valve spool in the control valve;
- a speed range control arm connected to the hydrostatic transmission for controlling the output speed of the hydrostatic transmission to one of high speed or low speed;
- a speed range lever pivotally mounted to move between a high speed range position and a low speed range position;
- a rod connected at a first end to the speed range lever and at a second end to the range control arm whereby movement of the speed range lever results in equivalent movement of the range control arm into one of either the high or low speed range positions;
- a control rod having a first end and a second end the first end pivotally mounted to the range control arm;
- a lockout plate having a plurality of apertures pivotally mounted at a first pivot point in proximity to the control link of the control valve operating means and having the second end of the control rod pivotally mounted through one aperture in the lockout plate allowing the lockout plate to be pivoted into interference proximity with the control link when the speed range lever is moved from the low speed position to the high speed position and the control handle for the control valve is in a forward or neutral position and restrictive pivotal movement of the lockout plate into position corresponding to the high speed position of the speed range lever through interference between the lockout plate and the appendage in the control link when the control link and the associated control valve spool is positioned to the reverse position by the control valve operating means.

* * * * *